J. OSTRANDER.

Improvement in Machines for Making Metallic-Tubes.

No. 5,120. Reissued Oct. 29, 1872.

Witnesses. Thomas McIlvain
John Parker

Jonathan Ostrander
by his Attys.
Howson and Son

UNITED STATES PATENT OFFICE.

JONATHAN OSTRANDER, OF RICHMOND, VIRGINIA.

IMPROVEMENT IN MACHINES FOR MAKING METALLIC TUBES.

Specification forming part of Letters Patent No. 113,332, dated April 4, 1871; reissue No. 5,120, dated October 29, 1872.

DIVISION A.

*To all whom it may concern:*

Be it known that I, JONATHAN OSTRANDER, of Richmond, county of Henrico, State of Virginia, have invented certain Improvements in Machines for Rolling Hollow Bars for Nuts, of which the following is a specification:

My invention relates to machinery for rolling hollow bars for nut-blanks; and consists of a grooved and vertically-adjustable table arranged at the discharge side of the rolls to prevent the tubular bar from turning and losing its shape, and also of an adjustable rest-bar for supporting the pile and former, as fully explained hereafter. The object of my invention is to produce a homogeneous nut-bar from a crude pile by repeated passes of the same between rolls, and consequently by a gradual reduction of the pile.

Figure 1:
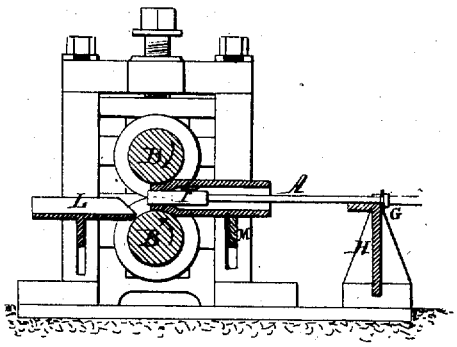
Figure 2:
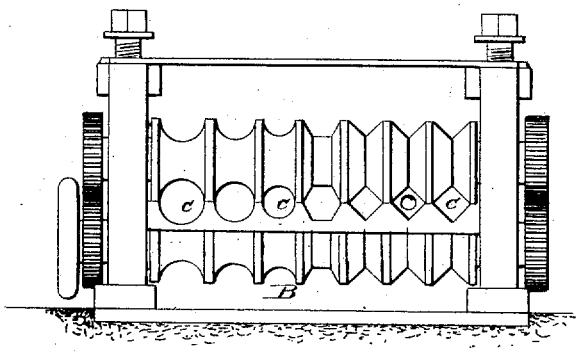
Figure 3:
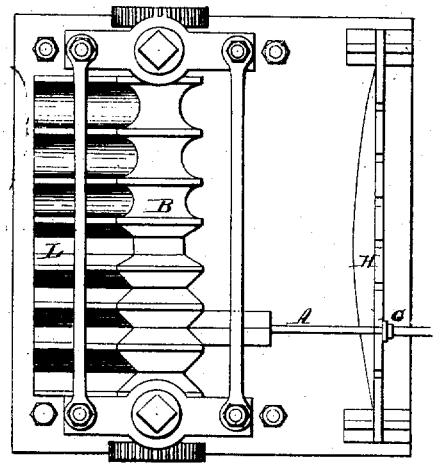
Figure 4:
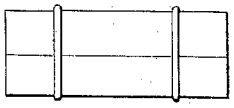
Figure 5:
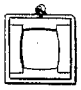
Figure 6:
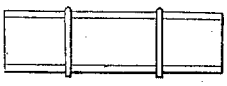
Figure 7:
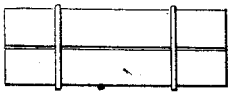
Figure 8:
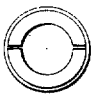
Figure 9:
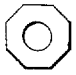
Figure 10:
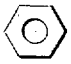
Figure 11:
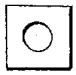

In the accompanying drawing, Figure 1 is a vertical section of a tube-rolling machine with my improvements; Fig. 2, a side view of the machine; Fig. 3, a plan view; Figs. 4 to 8, inclusive, represent crude piles or fagots prepared for conversion into nut-bars by the machine; and Figs. 9 to 11, inclusive, views of nut-bars completed by the machine.

B B are rolls having a series of grooves for reducing the crude tubular fagot by a succession of passes to the desired tubular nut-bar, the reduction being accomplished by rolling the fagot over and from a former or core, F, best observed in Fig. 1, the said core being attached to or forming a part of the rod A, which rests in one or other of the notches of the bar H, against which a collar, G, on the rod A, bears as the rolls, turning in the direction of the arrows, reduce the pile and draw it over and from the said core F. At the rear of the machine is a cable, L, having grooves corresponding in form and arrangement with the grooves of the rolls, so that on each pass of the tubular pile or bar the latter will be received by one of the grooves of the table, which is adapted to its shape, the groove preventing the bar from turning, and tending to retain it in a straight condition and in a proper position for being transferred to the front of the rolls prior to another pass. The table L is arranged to be vertically adjustable by screws or other means, its ends fitting into elongated slots or grooves in the frames or housings of the machine for that purpose. M is a rest-bar for supporting the pile and former, and is also vertically adjustable in the frame of the machine.

The tubular pile or fagot may be composed of any desired number of pieces formed in the muck or puddle rolls from scrap, pig, or old railroad iron tied together, as shown in Figs. 4 to 8, inclusive, these pieces being welded together by passing through the rolls and reduced to a solid tubular bar of the desired external shape of the nut; and this bar, when completed, is severed into proper lengths, each of which forms a nut-blank.

I do not claim the notched bar for supporting and retaining the rod A and former; but

I claim as my invention—

The combination, with the grooved rolls B, of the correspondingly-grooved and adjustable table L.

In testimony whereof I have signed my name to this specification in the presence of two subscribing witnesses.

JONATHAN OSTRANDER.

Witnesses:

CHARLES E. FOSTER.

A. G. HEYLMUN.